Aug. 9, 1938.                F. M. KIRKPATRICK                2,126,559
                                SOLDERING IRON
                              Filed March 30, 1934
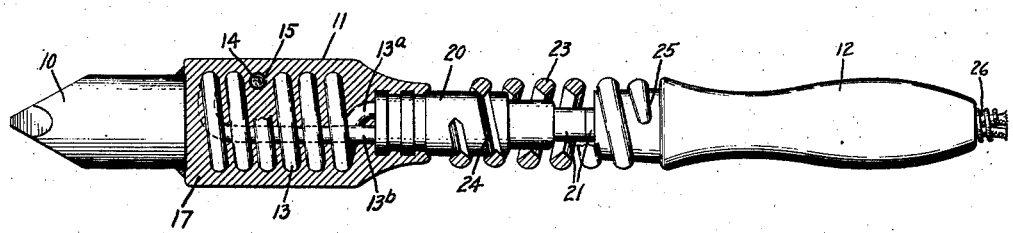
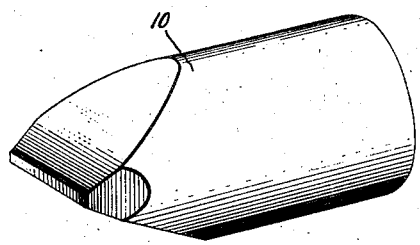
Inventor:
Floyd M. Kirkpatrick,
by  Harry E. Dunham
    His Attorney.

Patented Aug. 9, 1938

2,126,559

UNITED STATES PATENT OFFICE 2,126,559

SOLDERING IRON

Floyd M. Kirkpatrick, Erie, Pa., assignor to General Electric Company, a corporation of New York Application March 30, 1934, Serial No. 718,226

6 Claims. (Cl. 113—105)

This invention relates to soldering irons and it has for its object the provision of an improved working tip in soldering irons which materially lengthens the life of the iron.

Soldering irons, heretofore generally used, have been provided with working tips made of copper, because this material has a very high heat conductivity, which characteristic is desirable for efficient operation of the iron. Copper, however, possesses the disadvantages that it rapidly corrodes or decomposes by reacting with certain soldering fluxes heretofore used, such as ammonium chloride; oxidizes when heated while idle between the soldering operations; and moreover, rapidly wears away due to its mechanical softness.

This invention contemplates the provision of an improved soldering iron working tip which, while it has suitable thermal characteristics for efficient operation, is substantially free from disintegration or decomposition by oxidation and by soldering fluxes and the like and which has a very good mechanical strength, that is, which is relatively hard and wear resistant. In other words, this invention contemplates the provision of an improved soldering iron tip which is just as efficient in its operation as the copper tip, and which has a considerably longer life than the copper tip.

In accordance with this invention, the working tip of the soldering iron is made of an alloy consisting mainly of copper, but containing a minor quantity of beryllium, and the remainder of a metal having the effective alloying characteristics of cobalt. At present, the preferred alloy consists of about 97% copper, about 2.6% cobalt and about 0.4% beryllium.

For a more complete understanding of this invention, reference should be had to the accompanying drawing in which Fig. 1 is an elevation of a soldering iron embodying this invention, portions of the iron being shown in section so as to illustrate certain details of construction; and Fig. 2 is a perspective taken on an enlarged scale of a working tip used in the soldering iron of Fig. 1 and arranged in accordance with this invention.

Referring to the drawing, this invention has been shown as applied to an electrically heated soldering iron, although it is to be understood that the invention is not limited to soldering irons which are heated by electricity, but is applicable to soldering irons in general, irrespective of the mode of heating the iron. As shown, the soldering iron comprises a working tip 10, an electrical heating unit 11 in heat conducting relation with the tip 10 and a handle 12 which supports the heating unit and the working tip.

As previously pointed out, the soldering tip 10 arranged in accordance with this invention is made of an alloy consisting mainly of copper, but containing a minor quantity of beryllium and the remainder of a metal having the effective alloying characteristics of cobalt. At present, the preferred alloy consists of about 97% copper, about 2.6% cobalt and about 0.4% beryllium. This alloy is treated by heating it for approximately one hour at approximately 900° C. and then quenching it in water, and thereafter reheating to approximately 500° C. for one or two hours and then allowing it to cool. The rate of cooling from the 500° C. temperature seems to be immaterial, and so it may be air cooled.

The working tip 10 formed of the above alloy treated in the above-described fashion is far superior to the copper working tips heretofore generally used.

Its ability to resist corrosion or decomposition due to mixing with the various fluxes that are used in soldering operations is remarkable as compared with that of the copper tip.

It is not definitely understood at this time just why the soldering tip possesses such a marked capacity to resist corrosion and deterioration by fluxes, but it has been definitely established that it possesses this characteristic.

Likewise, tips arranged in accordance with this invention resist oxidation when heated while idle to a marked degree. It is thought that this is due to the fact that when this tip oxidizes, a protective oxidized layer is formed over the tip which resists further oxidation. With the copper tip, on the other hand, the oxidized layers peel off when the temperature of the tip changes, thereby exposing fresh copper surfaces to the atmosphere which in turn are oxidized.

Moreover, this tip has a Brinell hardness of between 200–220 as compared with the average Brinell hardness of 30 in soft copper, and 90–100 in cold worked copper, and hence, is much more wear resistant than the copper tips.

Moreover, while the alloy of which this tip is made has considerable mechanical strength and resistance to wear, it is readily machinable and is capable of being forged and rolled, and thus may be formed into soldering tips having any desired suitable shape.

Because it resists corrosion and oxidation and has a relatively high wear resistance, this tip has a life much longer than the standard copper tips heretofore used. In a particular soldering application, it has been found that a standard calorized copper tip after about six weeks of use lost about one inch of its length, had completely lost its contour, and was badly pitted. A soldering tip arranged in accordance with this invention was then used in identically the same soldering operations, and it was found that after five months use it still was in excellent condition.

The tip arranged in accordance with this invention has a heat conductivity of approximately 45% that of the copper tips used heretofore. It has been found that while the heat conductivity of the tip is less than that of the copper tips, it nevertheless is just as efficient in its soldering operation as is the copper tip. This is probably because the tip of this invention has a larger heat capacity than that of the copper tips. At any rate it has been found that the tip of this invention will actually melt solder at a somewhat faster rate than will copper tips.

In brief, therefore, the advantages of this tip known at the present time reside in its ability to resist corrosion and decomposition by reacting with fluxes, its ability to resist oxidation when not in use, its ability to solder just as efficiently as the copper tips heretofore generally used, and its ability to resist mechanically the wear to which tips are subjected.

As pointed out above, the soldering tip arranged in accordance with this invention has general application. In the soldering iron disclosed in this application, the soldering tip 10 is secured directly to the heating unit 11. The heating unit 11, as shown, comprises a heating element 13 which preferably will be of the sheathed type, such as described and claimed in United States patent to C. C. Abbott No. 1,367,341, dated February 1, 1921. This unit in brief comprises a helical resistance heating element 14 encased within a metallic sheath 15 and embedded in and supported in spaced relation with respect to the sheath by means of a suitable electrically insulating, heat refractory and conducting material, such as magnesium oxide. The heating element 13, as shown, is formed in a plurality of convolutions, the terminal ends 13a and 13b of the convolutions being brought out at the handle end of the soldering iron. The heating coil is embedded in a heat conducting mass of material 17, which preferably will be formed of copper. The tip 10, as shown, is secured directly to the heating body 11 in end to end relation with it. Preferably, the tip will be silver soldered to the body 11 with a butt joint, as shown.

Secured in the mass of material 17 at the handle end is a suitable metallic member 20 which is provided with spaced apertures (not shown) for receiving the two ends 13a and 13b of the heating unit.

It will be understood that the terminals (not shown) of the heating unit will be brought to these ends of the heating element and that they will be threaded through suitable insulators 21 interposed between the heating element and the handle 12. These members 21 are provided with spaced apertures through which the terminals are passed, and through the handle end of which suitable electrical supply leads (not shown) are fed to the terminals.

The heating element 11 with the tip secured thereto is secured to the handle 12 by means of a helically shaped member 23, helical V-shaped grooves 24 and 25 being provided in the metallic member 20 of the heating unit and the handle 12 respectively arranged to receive one or more of the end turns of the helical member 23.

A suitable twin supply conductor 26 is threaded through a bore (not shown) provided for it in the handle 12 and is electrically connected with the above-mentioned supply leads connected with the terminals of the heater.

The specific construction of the heating unit 11, the handle 12 and the mechanical connection between the handle and the heater, the connections between the supply leads and the terminals and between the electrical supply conductor 26 and the leads form no part of this invention, and it is believed to be unnecessary, therefore, to describe these elements in greater detail.

It is to be understood, however, that the mass of heat conducting material 17 may be formed of the above copper-beryllium-cobalt alloy as well as the tip 10. However, it is generally more economical to make the tip 10, which alone contacts the fluxes and the work, as a separate member and of the alloy, while the body 11 will be formed of copper.

In this particular iron where the tip 10 is silver soldered to the body 11, the tip may be treated conveniently in the following manner. The soldering occurs over a temperature range of 820 to 870° C. Complete fluidity of the solder occurs at approximately 870° C. As soon as the solder has solidified sufficiently to hold the tip, the tip is quenched in water. The temperature just previous to quenching will probably be around 825° C. The quenched tip is then drawn, which operation may be accomplished either by reheating the quenched tip by external heating means to approximately 500° C., holding it at this temperature for one or two hours and then cooling it in air from 500° C.; or if the capacity of the tip is such as to operate at 500–525° C. when idle, the heating unit 11 may be used to draw the quenched tip for an hour or two at 500° C. after which the tip is allowed to cool in air.

If a removable tip is used, such as a tip screw-threaded onto the heating unit, as described in the U. S. patent to C. C. Abbott, No. 1,708,995, and dated April 16, 1929, the tip may be treated either before or after it is machined to shape and size and to provide it with threads, and preferably as described in a previous portion of this specification; That is, the treatment will consist in heating the tip for approximately one hour at 900° C. then quenching in water and then reheating the quenched tip at 500° C. and holding the tip at this temperature for one or two hours; the tip is then allowed to cool in air from 500° C.

While it is preferable to use a copper-cobalt-beryllium alloy of substantially the above-specified composition, it is to be understood that other metals having the effective alloying characteristics of cobalt may be substituted for the cobalt without departing from this invention.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States, is:—

1. A soldering iron comprising a working tip formed of an alloy consisting substantially of copper, beryllium and cobalt, said copper constituting approximately 97% of said alloy, said beryllium constituting an appreciable amount of said alloy, but less than 1% thereof, and said cobalt constituting the remainder of said alloy.

2. A soldering iron comprising a working tip formed of an alloy consisting substantially of copper, beryllium and cobalt, said beryllium and cobalt constituting from about 0.4% to about 3% of said alloy, the percentage of beryllium in said alloy being less than the percentage of cobalt in said alloy, and said copper constituting the remainder of said alloy.

3. A soldering iron tip formed of an alloy consisting of copper, beryllium and cobalt, the copper constituting approximately 97% of said alloy, the beryllium not appreciably more than 1% of said alloy and the cobalt constituting the remainder of said alloy.

4. In a soldering iron, a working tip formed of an alloy of about 97% copper, about 2.6% cobalt and 0.4% beryllium.

5. In a soldering iron, a working tip of relatively great longevity formed of copper, cobalt and beryllium alloy of about 97% copper, about 2.6% cobalt and 0.4% beryllium and having a Brinell hardness of approximately 200–220 and a heat conductivity of about 45% that of copper.

6. A soldering iron tip formed of an alloy consisting mainly of copper with small amounts of beryllium and cobalt to give the tip increased resistance to wear and increased resistance to oxidation and disintegration when subjected to temperatures higher than normal operating temperatures and when brought into contact with solder and soldering fluxes, the beryllium and cobalt constituting from 0.4% to 3% of the alloy and the beryllium content being less than the cobalt content.

FLOYD M. KIRKPATRICK.